United States Patent Office 2,767,995
Patented Oct. 23, 1956

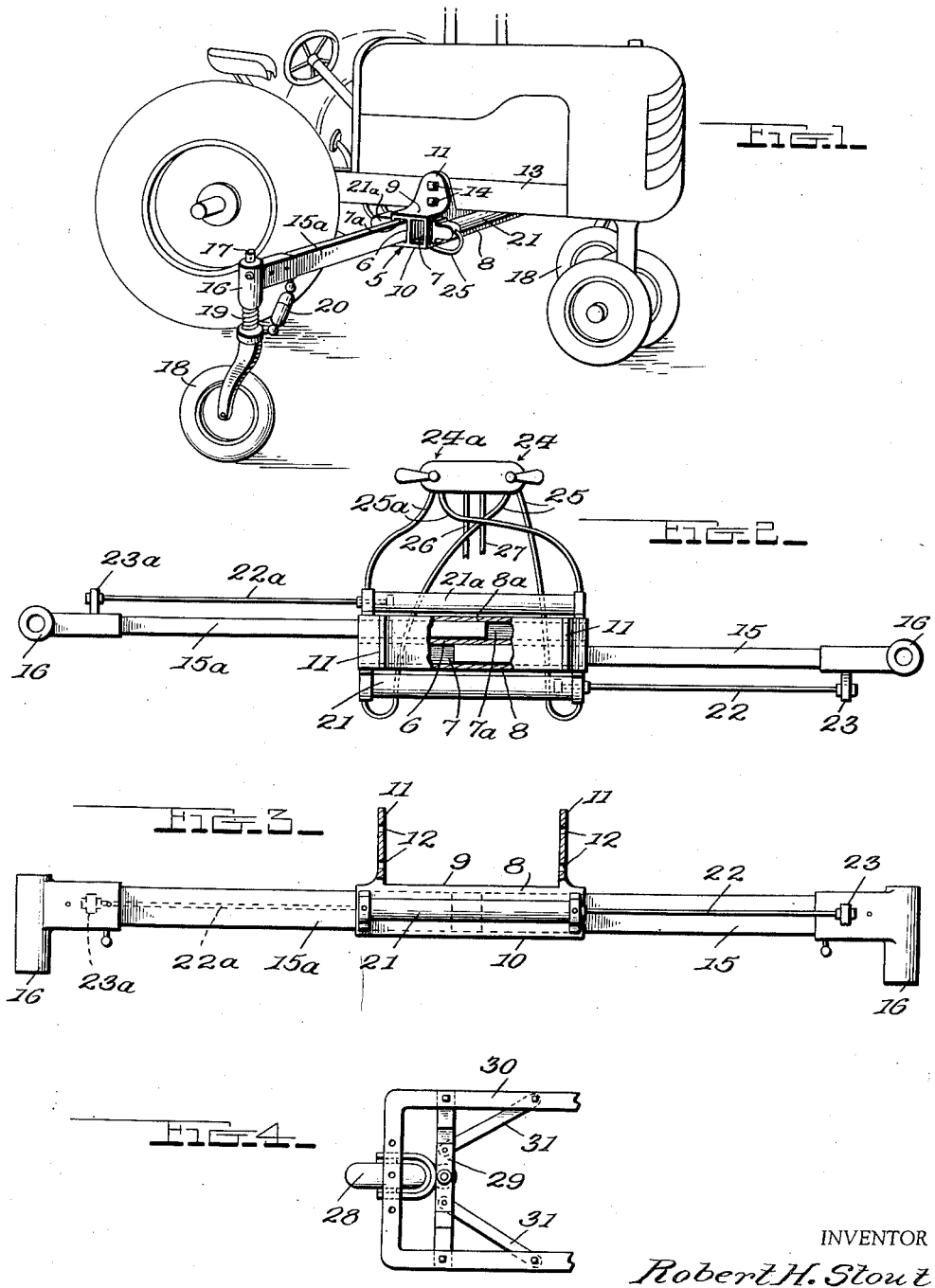

2,767,995
TRACTOR ANTI-TILTING ATTACHMENT
Robert H. Stout, Elwood, Ind.
Application June 8, 1953, Serial No. 360,090
2 Claims. (Cl. 280—34)

Serious accidents, often resulting in injury and death of tractor drivers, have been caused by tractors tipping over during use, particularly when working on the sides of hills. The present invention is designed to provide a novel attachment to prevent accidents of this kind.

The attachment is in the form of a supplemental axle having ground wheels at its ends. This supplemental axle is secured at a location between the usual front and rear wheels of the tractor and is sufficiently long to project laterally such a distance as to effectively brace the tractor against lateral tilting.

An important object of the invention is to provide a novel construction in which either end of the supplemental axle may be projected and the other end retracted, thus permitting effective bracing of the tractor at its downhill side without encumbering its uphill side with a similar projection.

Another object of the invention is to provide a novel construction in which projection and retraction of the ends of the supplemental axle may be effected as required without the necessity of the tractor driver leaving his seat.

A further object of the invention is to provide a novel construction in which both ends of the supplemental axle may be retracted when the tractor is to be driven along a road or the like on which the projecting axle ends would impart a hazardous width to the tractor.

A still further object of the invention is to provide the ground wheels of the supplemental axle in the form of casters. This not only permits the wheels to take any course being taken by the tractor, but allows the projection and retraction of the axle ends without lateral dragging of these wheels.

Another object of the invention is to construct the supplemental axle from a fixed central section and two end sections, the three sections being telescopically engaged in such manner that neither end section can interfere with projection and retraction of the other end section.

Yet another object of the invention is to provide a novel construction in which the central axle section carries hydraulic cylinders for extending and retracting the end section, said cylinders being connectable with the usual hydraulic system of a tractor having a hydraulic lift.

A further object is to provide a second attachment for the tractor which will prevent the latter from tipping over backwards.

With the above and other objects in view that will become apparent as the nature of the invention is better understood, the same consists in the novel form, combination and arrangement of parts hereinafter more fully described, shown in the accompanying drawing, and particularly claimed.

In the drawing:

Fig. 1 is a perspective view of a tractor equipped with the invention;

Fig. 2 is a plan view of the attachment, partly broken away and in section, the wheels of the supplemental axle being omitted;

Fig. 3 is a front elevation of the elements shown in Fig. 2, partly broken away and in section; and Fig. 4 is a plan view of the second attachment mounted under the tractor hitch.

In the form of the invention disclosed in the drawings, the end sections of the supplemental axle are hydraulically projectable and retractible, but it is of course possible to provide manually operable means for accomplishing the same result, to adapt the invention to tractors having no hydraulic system. Therefore, even though the disclosed construction will be rather specifically described, it is to be borne in mind that this and other variations may well be made.

The central section 5 of the supplemental axle is in the form of an elongated rectangular casing open at both ends and provided with a central partition 6 from end to end, providing two flat-sided guideways 7 and 7a between said partition and the front and rear side walls 8 and 8a of said casing. The partition 6 is joined to both the casing top 9 and the bottom 10. The top 9 has two parallel upstanding rigid lugs 11 having bolt holes 12 (Fig. 3) permitting rigid bolting of the casing 5 to the tractor frame 13, the bolts being shown at 14 in Fig. 1. The casing is located between the ends of the tractor frame 13, underlies said frame and extends transversely thereof.

The two end sections of the supplemental axle are shown at 15 and 15a, said sections 15 and 15a being slidably and non-rotatably engaged with the two guideways 7 and 7a, respectively. The outer ends of these end sections 15 and 15a have suitable vertical bearings 16 in which the vertical shafts 17 of two caster wheels 18 are swiveled. Each shaft 17 is allowed vertical movement in its bearing 16 and has a coiled load-carrying spring 19 upon which the bearing rests, allowing vertical yielding of the wheel as required. To prevent excessive vertical jumping of the two caster wheels, shock absorbers such as that indicated at 20 in Fig. 1 may be employed.

Providing the wheels 18 in the form of casters, has two advantages. First, these wheels will follow any course taken by the tractor. Second, when the axle sections 15 and 15a are being projected or retracted, the wheels 18 will roll instead of laterally dragging as would occur if said wheels were not of swiveled form.

Any of various appropriate mechanisms may be provided to be actuated by or controlled by the tractor driver for projecting and retracting the axle sections 15 and 15a independently or simultaneously as required, without the necessity of the driver leaving his seat. A hydraulic mechanism has been shown for connection with a conventional hydraulic system of a tractor having a hydraulic lift.

Two hydraulic cylinder- and piston-assemblies 21 and 21a are shown, secured to the front and back walls 8 and 8a respectively, of the central axle section or casing 5. The piston rods 22 and 22a of the assemblies 21 and 21a are connected at 23 and 23a, respectively, with the end sections 15 and 15a of the axle. Suitable central valves 24 and 24a have been shown connected by lines 25 and 25a with the ends of the cylinders of the assemblies 21 and 21a, respectively. These valves receive their fluid from the usual hydraulic system of the tractor through one line 26 and exhaust back to said system through another line 27. Whenever, either valve is operated to supply fluid to one end of its respective cylinder and move the piston in one direction, said valve opens the other end of said cylinder to exhaust, and when the valve is restored to its neutral position the piston remains in any position to which it has been shifted, as well known in hydraulic systems.

The valves 24 and 24a may be suitably mounted on the tractor in convenient reach of the driver and he will thus have full control of the supplemental axle, permitting him to project either end sections 15 or 15ª and simultaneously retract the other, or simultaneously project both sections 15, 15ª, as conditions may dictate. The attachment may thus be adjusted as required to stabilize the tractor against dangerous lateral tilting. Moreover, when the tractor is to be driven along a road or the like, both end sections may be retracted to avoid excessive and hazardous width.

With the supplemental axle above described, a further precaution may be employed to prevent the tractor from tipping over backward (see Fig. 4). In this view, a rear caster wheel 28 is shown mounted on a transverse centrally depressed bar 29 secured directly under the tractor hitch 30 and suitably braced at 31.

From the foregoing, it will be seen that a novel and advantageous construction has been described for attaining the desired ends, and while there is herein shown and described the preferred embodiment of the invention, it is nevertheless to be understood that minor changes may be made therein without departing from the spirit and scope of the invention as claimed.

I claim:

1. An anti-tilting attachment for tractors including a rectangular box-like casing open at its ends and having a centrally disposed longitudinal vertical partition, means for securing said casing transversely beneath a tractor frame, a pair of axle sections each having one end slidably mounted in said casing on a respective side of said partition, a pair of hydraulic cylinders extending along and fixed to the sides of said casing, piston rods extending from said cylinders and having their free end secured to said axle sections adjacent their outer ends, an elongated valve casing, a pair of independent valves at the ends of the valve casing, a supply and an exhaust connection extending from each valve to the ends of a respective cylinder, means to supply and exhaust operative fluid to and from said valve casing, and caster wheel structures carried by the outer ends of said axle sections.

2. An anti-tilting attachment for tractors including a rectangular box-like casing open at its ends and having a centrally disposed longitudinal vertical partition, means for securing said casing transversely beneath a tractor frame, a pair of axle sections each having one end slidably mounted in said casing on a respective side of said partition, a pair of hydraulic cylinders extending along and fixed to the sides of said casing, piston rods extending from said cylinders and having their free end secured to said axle sections adjacent their outer ends, an elongated valve casing, a pair of independent valves at the ends of the valve casing, a supply and an exhaust connection extending from each valve to the ends of a respective cylinder, means to supply and exhaust operative fluid to and from said valve casing, and caster wheel structures carried by the outer ends of said axle sections, said structures each including a wheel-supporting fork, a stem projecting upwardly from said fork and rotatably mounted in an axle section, a spring surrounding said stem between the axle section and fork, and a shock absorber disposed diagonally of the fork and axle section.

References Cited in the file of this patent

UNITED STATES PATENTS

| | | |
|---|---|---|
| 561,262 | Lincoln | June 2, 1896 |
| 940,169 | Lathrop | Nov. 16, 1909 |
| 1,478,428 | Duncan | Dec. 25, 1923 |
| 2,457,821 | Johnson | Jan. 4, 1949 |
| 2,561,444 | Martin | July 24, 1951 |